(12) United States Patent
Ho

(10) Patent No.: US 10,817,188 B2
(45) Date of Patent: Oct. 27, 2020

(54) DATA STORING METHOD AND SYSTEM INITIALIZING METHOD AFTER SUDDEN POWER-OFF EVENT

(71) Applicant: Silicon Motion, Inc., Jhubei, Hsinchu (TW)

(72) Inventor: Hsin-Hung Ho, New Taipei (TW)

(73) Assignee: SILICON MOTION, INC., Jhubei, Hsinchu (TW)

( * ) Notice: Subject to any disclaimer, the term of this patent is extended or adjusted under 35 U.S.C. 154(b) by 11 days.

(21) Appl. No.: 15/473,617

(22) Filed: Mar. 30, 2017

(65) Prior Publication Data

US 2017/0344288 A1 Nov. 30, 2017

(30) Foreign Application Priority Data

May 30, 2016 (TW) .............................. 105116866 A

(51) Int. Cl.
*G06F 3/06* (2006.01)
*G06F 1/30* (2006.01)

(52) U.S. Cl.
CPC .............. *G06F 3/0619* (2013.01); *G06F 1/30* (2013.01); *G06F 3/065* (2013.01); *G06F 3/068* (2013.01); *G06F 3/0632* (2013.01); *G06F 3/0647* (2013.01); *G06F 3/0656* (2013.01)

(58) Field of Classification Search
CPC .............. G06F 1/28; G06F 1/30–3074; G11C 14/00–009
See application file for complete search history.

(56) References Cited

U.S. PATENT DOCUMENTS

| 4,523,295 | A  | * | 6/1985  | Zato ......................... G06F 1/30 340/660 |
| 7,954,006 | B1 | * | 5/2011  | Mangipudi ............... G06F 1/30 713/340 |
| 9,588,565 | B1 | * | 3/2017  | Harland .................... G06F 1/28 |
| 9,779,016 | B1 | * | 10/2017 | Shen .................. G06F 11/1456 |
| 9,830,257 | B1 | * | 11/2017 | Booth ................ G06F 12/0246 |
| 2004/0190210 | A1 | * | 9/2004 | Leete ....................... G06F 1/30 361/90 |

(Continued)

FOREIGN PATENT DOCUMENTS

| CN | 101539891 A | 9/2009 |
| CN | 104050108 A | 9/2014 |

(Continued)

OTHER PUBLICATIONS

Translation of JP-07295672. 2018.*

(Continued)

*Primary Examiner* — Nathan Sadler
(74) *Attorney, Agent, or Firm* — WPAT, PC

(57) ABSTRACT

A data storing method for a data storage device is provided. The data storage device includes a volatile memory and a non-volatile memory. The data storing method includes steps of: designating a data flush block, wherein the data flush block is the non-volatile memory without data buffering function; determining whether a sudden power-off event occurs; and when the sudden power-off event occurs, copying or moving first data stored in the volatile memory to the data flush block. A data storing method after a sudden power-off event occurs is also provided.

8 Claims, 3 Drawing Sheets

(56) References Cited

U.S. PATENT DOCUMENTS

| | | | | |
|---|---|---|---|---|
| 2006/0059385 A1* | 3/2006 | Atri | ................... | G06F 11/1441 |
| | | | | 714/14 |
| 2011/0119442 A1* | 5/2011 | Haines | ............... | G06F 12/0246 |
| | | | | 711/113 |
| 2014/0215245 A1* | 7/2014 | Zhang | ................. | G06F 1/3234 |
| | | | | 713/323 |
| 2015/0169238 A1* | 6/2015 | Lee | .................... | G06F 12/0871 |
| | | | | 711/103 |
| 2015/0378415 A1* | 12/2015 | George | .................... | G06F 1/30 |
| | | | | 307/64 |
| 2016/0118121 A1* | 4/2016 | Kelly | ................ | G06F 13/4068 |
| | | | | 710/301 |
| 2016/0378621 A1* | 12/2016 | Amidi | ................ | G06F 11/1662 |
| | | | | 714/6.2 |
| 2017/0168890 A1* | 6/2017 | Marripudi | ................ | G06F 1/28 |

FOREIGN PATENT DOCUMENTS

| | | | | |
|---|---|---|---|---|
| JP | 07295672 A | * | 11/1995 | ........... G06F 1/1616 |
| TW | I396082 | | 5/2013 | |
| TW | I438632 | | 5/2014 | |
| TW | 201430853 | | 8/2014 | |
| TW | 201528281 | | 7/2015 | |

OTHER PUBLICATIONS

Continued translation of JP-07295672. 2018.*
Office Action issued by Taiwan Intellectual Property Office dated Jun. 14, 2017.

* cited by examiner

DATA STORING METHOD AND SYSTEM INITIALIZING METHOD AFTER SUDDEN POWER-OFF EVENT

FIELD OF THE INVENTION

The present invention relates to a technology of data storage, and more particularly to a data storing method and a system initializing method after a sudden power-off event occurs.

BACKGROUND OF THE INVENTION

A general data storage device mainly includes a control unit, a voltage pull-down module, a volatile memory and a non-volatile memory. The control unit is electrically coupled to a host (such as a computer or a handheld mobile device) and configured to communicate and transmit data with the host. In general, the control unit writes the data transmitted from the host into the non-volatile memory. However, if the data transmitted from the host is random data and has a relatively small data amount (e.g., smaller than one page), the control unit may first store the received random data into the volatile memory and then move the random data to the non-volatile memory from the volatile memory when the random data in the volatile memory is accumulated to a certain amount. Besides the data transmitted between the control unit and the host, the control unit also stores the data required for its operation, such as the address mapping table, into the volatile memory.

In general, the voltage pull-down module is configured to convert external power provided by the host into a plurality of pull-down powers with different voltage levels. The pull-down powers are then provided to the control unit, the volatile memory and the non-volatile memory as the respective operating powers. However, if the host is suddenly shut down and having the so-called sudden power-off event, the random data stored in the volatile memory may disappear as the power supplied to the storage device is suddenly stopped or interrupted. Therefore, it is quite necessary to develop a data storage device and an operating method thereof to overcome or avoid the issues in sudden power-off events.

SUMMARY OF THE INVENTION

Therefore, one objective of the present invention is to provide a data storing method. By adopting the data storing method, a data storage device equipped with a voltage pull-up module and a charge storage device can store data more safely and accurately when sudden power-off events occur.

Another objective of the present invention is to provide a system initializing method after a sudden power-off event occurs.

The present invention provides a data storing method for a data storage device. The data storage device includes a volatile memory and a non-volatile memory. The data storing method includes steps of: designating a data flush block, wherein the data flush block is the non-volatile memory without data buffering function; determining whether a sudden power-off event occurs; and when the sudden power-off event occurs, copying or moving first data stored in the volatile memory to the data flush block.

The present invention further provides a system initializing method after a sudden power-off event occurs. The system initializing method includes steps of: determining whether the sudden power-off event occurs; if yes, searching for a data flush block, wherein the data flush block is a non-volatile memory without data buffering function; determining whether there is data stored in the data flush block; if yes, copying or moving the data to a data block; and restructuring a data link according to the data in the data block.

The present invention still further provides a data storing method for a data storage device. The data storage device includes a volatile memory and a non-volatile memory. The data storing method includes steps of: designating a data flush block, wherein the data flush block is the non-volatile memory without data buffering function; determining whether a sudden power-off event occurs, and when the sudden power off event occurs, copying or moving data stored in an internal register to the data flush block.

In summary, by equipping the data storage device with an additional voltage pull-up module and charge storage device and designating a data flush block without data buffering function from the non-volatile memory, the charge storage device can extend the power supply time of the data storage device of the present invention once a sudden power-off event occurs. Therefore, the control unit may copy or move the data from the volatile memory to the data flush block within the extended power supply time; and consequently, the data storage device and the data storing method of the present invention can store data more safely and accurately.

BRIEF DESCRIPTION OF THE DRAWINGS

Other advantages, objectives and features of the present invention will become apparent from the following description referring to the attached drawings.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
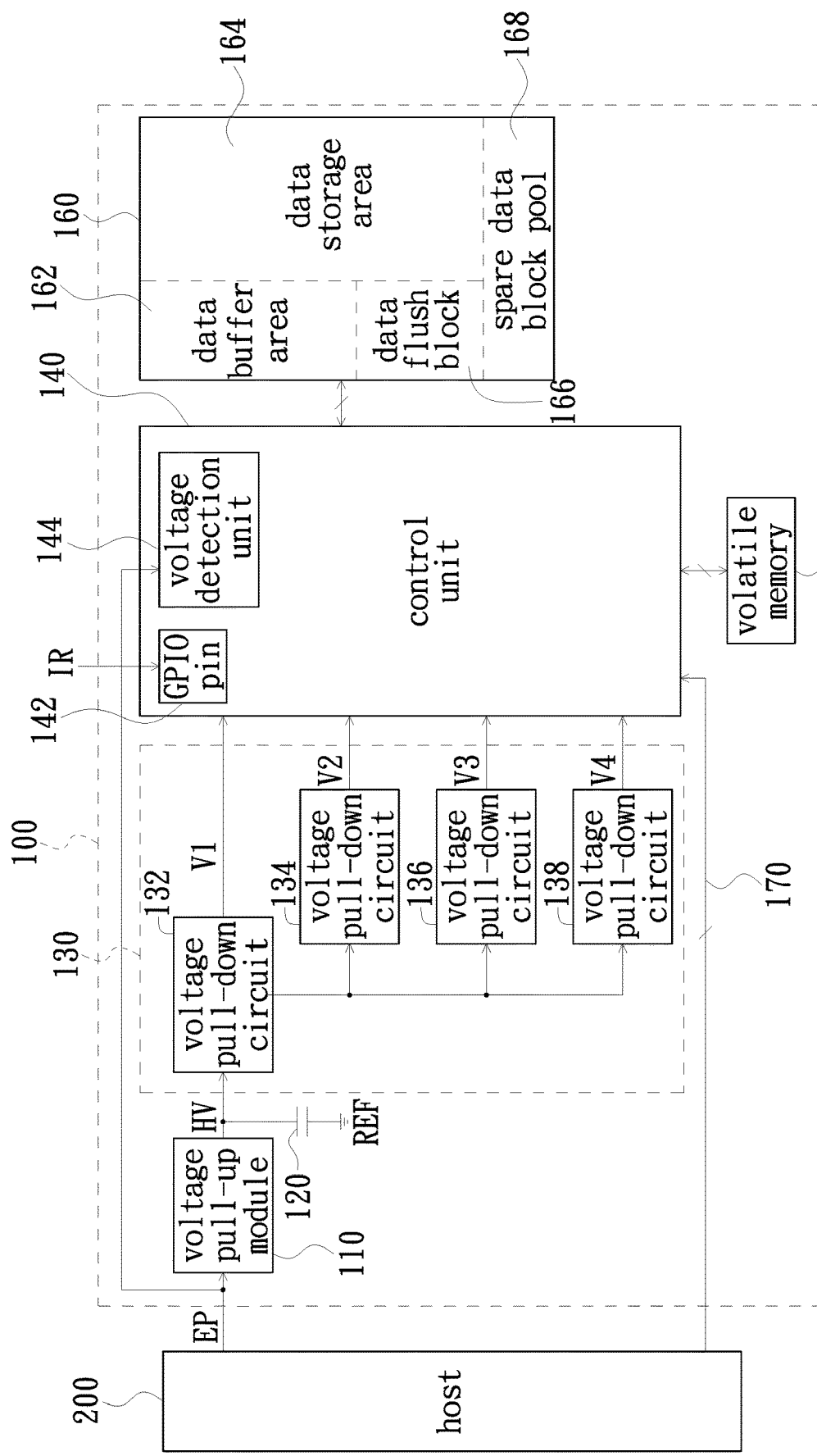
FIG. 1 is a schematic block view of a data storage device in accordance with an embodiment of the present invention.

FIG. 1 is a schematic block view of a data storage device in accordance with an embodiment of the present invention. As shown in FIG. 1, the data storage device 100 of the present embodiment is electrically coupled to a host 200 and includes a voltage pull-up module 110, a charge storage device 120, a voltage pull-down module 130, a control unit 140, a volatile memory 150 and a non-volatile memory 160. The voltage pull-up module 110 is configured to receive an external power EP (e.g., 5V) provided by the host 200, pull up the voltage level of the received external power EP and generate a pull-up power HV (e.g., 12V) accordingly. The charge storage device 120 is electrically coupled between the pull-up power HV and a reference voltage level REF. In the present embodiment, the charge storage device 120 is implemented by a capacitor.

The voltage pull-down module 130 is configured to receive the pull-up power HV, pull down the voltage level of the received pull-up power HV and generate at least one pull-down power accordingly. In the present embodiment, the voltage pull-down module 130 includes voltage pull-down circuits 132, 134, 136 and 138. The voltage pull-down circuits 132, 134, 136 and 138 are configured to generate pull-down powers V1 (e.g., 5V), V2 (e.g., 3.3V), V3 (e.g., 1.5V) and V4 (e.g., 1.2V) respectively. The control unit 140 is configured to receive the pull-down powers V1, V2, V3 and V4 and provides the received pull-down powers V1, V2, V3 and V4 as operating powers of its internal components. In addition, the control unit 140 is further configured to transfer at least one of the received pull-down powers V1, V2, V3 and V4 to the volatile memory 150 and the non-volatile memory 160. For example, the control unit 140 may transfer the pull-down power V3 to the volatile memory 150 and transfer the pull-down power V4 to the non-volatile memory 160, thereby providing the pull-down powers V3 and V4 as the operating powers for the volatile memory 150 and the non-volatile memory 160 respectively. In another embodiment, a portion of the pull-down powers V1, V2, V3 and V4 may be directly provided to the volatile memory 150 and the non-volatile memory 160 without the control unit 140. For example, the pull-down powers V2 and V3 may be provided to the non-volatile memory 160 directly and the pull-down power V3 may be provided to the volatile memory 150 directly. Because the control unit 140 is not involved in the transmission of the pull-down powers, the load and the circuit size of the control unit 140 are reduced; however, it is understood that power management of the control unit 140 on the volatile memory 150 and the non-volatile memory 160 are moot accordingly.

The volatile memory 150 may be implemented by a DRAM (dynamic random access memory). The non-volatile memory 160 may be implemented by a flash memory, a MRAM (magnetoresistive RAM), a FRAM (ferroelectric RAM), a PCM (phase change memory), a STTRAM (spin-transfer torque RAM), a ReRAM (resistive RAM), a Memristor or other memory device suitable for long-term data storage.

In the present embodiment as shown in FIG. 1, the non-volatile memory 160 includes a data buffer area 162, a data storage area 164, a data flush block 166 and a spare data block pool 168. In one preferred embodiment, the data storage area 164 includes a plurality of first data blocks (not shown). Each of the memory cells in each of the first data blocks is configured to store M-bit data. The data buffer area 162 includes a plurality of second data blocks (not shown) and the data flush block 166 includes one second data block. Each of the memory cells in each of the second data blocks is configured to store N-bit data. In the present embodiment, the aforementioned M and N are positive integers, and N is smaller than M. In one embodiment, the spare data block pool 168 includes a plurality of the first data blocks. In another embodiment, the spare data block pool 168 further includes a plurality of the second data blocks. Under a normal operation, the data flush block 166 is configured to not provide any data buffering function; that is, the data from the host 200 is stored in the data buffer area 162. The control unit 140 accesses the data flush block 166 only when an emergency occurs. For example, when power is suddenly shut off (hereunder is referred as a sudden power-off event), the control unit 140 flushes the data stored in the volatile memory 150 into the data flush block 166 or the control unit 140 flushes the data stored in the internal registers thereof into the data flush block 166. Once the power is recovered and the system is in a power recovery procedure, the control unit 140 accesses the data flush block 166, retrieves the data originally stored in the volatile memory 150 or the internal registers thereof and restructures the data link.

In one embodiment, the non-volatile memory 160 is implemented by a TLC (triple-level cell) type of flash memory and the memory cells in a portion of the first data blocks are converted into a MLC (multi-level cell) type of flash memory (or, switched to the MLC mode) or a SLC (single-level cell) type of flash memory (or, switched to the SLC mode) by utilizing software; where the MLC type of flash memory or the SLC type of flash memory converted from the TLC type of flash memory is referred to as the second data blocks. In another embodiment, the non-volatile memory 160 is implemented by a MLC type of flash memory and the memory cells in a portion of the first data blocks are converted into a SLC type of flash memory (or, switched to the SLC mode) by utilizing software; where the SLC type of flash memory converted from the MLC type of flash memory is referred to as the second data blocks. In still another embodiment, the first data block is implemented by a TLC type of flash memory and the second data block is implemented by a SLC type of flash memory. In yet another embodiment, the first data block is implemented by a MLC type of flash memory and the second data block is implemented by a SLC type of flash memory.

Please refer to FIG. 1 again. In the present embodiment, the control unit 140 is electrically coupled to the host 200 via a communication interface 170 and configured to communicate and transmit data with the host 200 via the communication interface 170. The communication interface 170 may be implemented by a SATA (serial ATA (advanced technology attachment)), a SAS (serial attached SCSI), a PCI-E (peripheral component interconnect express) or a USB (universal serial bus). Specifically, after receiving the data transmitted from the host 200 via the communication interface 170, the control unit 140 first buffers the received data in the second data block in the data buffer area 162 and then moves the data buffered in the data buffer area 162 to the first data block in the data storage area 164 at a proper time. In the present embodiment, if the data transmitted from the host 200 is random data and has a relatively small data amount (e.g., smaller than one page), the control unit 140 first stores the received random data into the volatile memory 150 and then moves the random data to the non-volatile memory 160 from the volatile memory 150 when the random data in the volatile memory 150 is accumulated to a certain amount.

The control unit 140 selectively includes at least one of a GPIO (general purpose input/output) pin 142 and a voltage detection unit 144. In the present embodiment, the control unit 140 includes both of the GPIO pin 142 and the voltage detection unit 144. The voltage detection unit 144 is configured to receive the external power EP provided by the host 200 and determine whether the received external power EP is smaller than a first voltage threshold (e.g., 4V). The control unit 140 would acknowledge an interrupt or stop of the external power EP when the voltage detection unit 144 determines that the external power EP is smaller than the first voltage threshold. The GPIO pin 142 is configured to receive a shutdown notification signal IR provided by the host 200 and determine whether the shutdown notification signal IR is smaller than a second voltage threshold (e.g., 0.8V). The control unit 140 would acknowledge an interrupt or stop of the external power EP when the GPIO pin 142 determines that the external power EP is smaller than the second voltage threshold.

A data storing method of the present invention is executed when the external power EP is interrupted or stopped. FIG.

Figure 2:
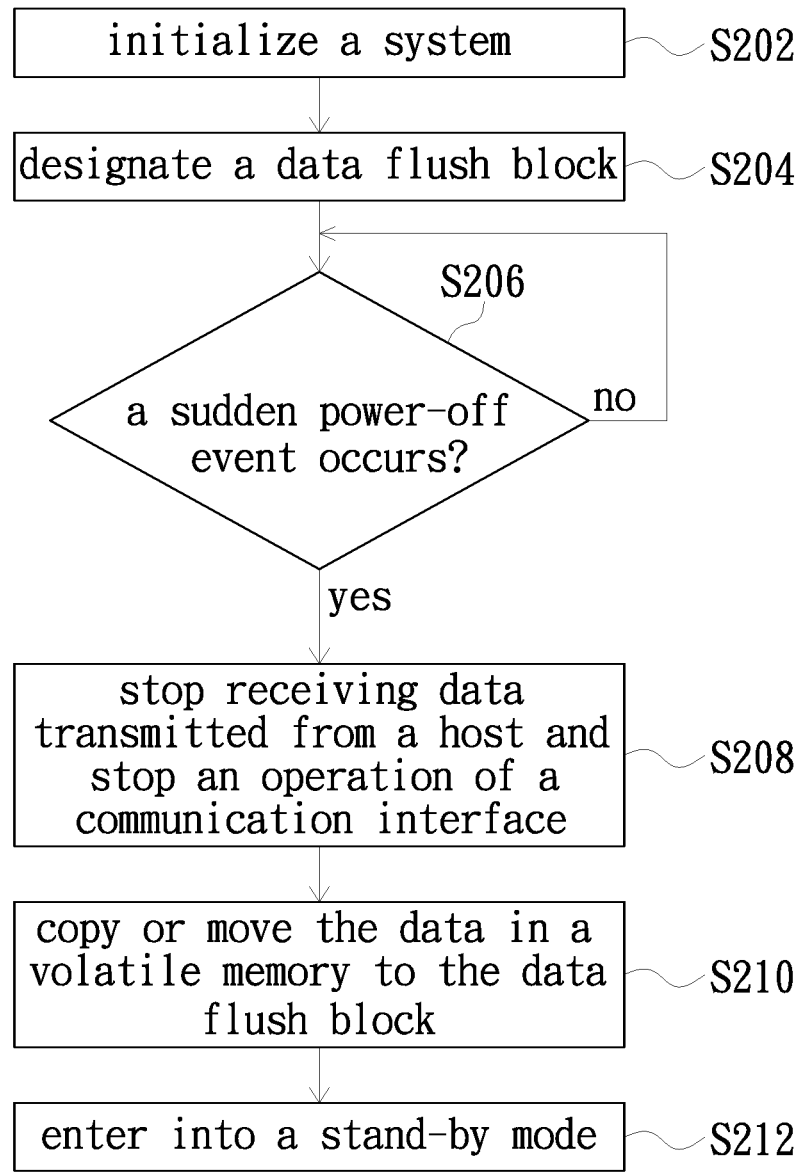
FIG. 2 is a flowchart of a data storing method in accordance with an embodiment of the present invention.

2 is a flowchart of a data storing method in accordance with an embodiment of the present invention. Please refer to FIG. 1 and FIG. 2 together. First, performing step S202: initializing a system. The initialization of a system can be divided into two types, one being a general initialization and the other being an initialization after a sudden power-off event. A difference lies in that the initialization after a sudden power-off event further includes a power recovery procedure.

Thereafter, performing step S204: configuring the control unit 140 to designate the data flush block 166 after the initialization. Thereafter, performing step S206: configuring the control unit 140 to determine whether the data storage device 100 has the sudden power-off event according to the determination results from the GPIO pin 142 and the voltage detection unit 144. It is normal that a voltage level has a relatively minor volatility or variation; therefore, in one preferred embodiment the data storage device 100 would be determined to have the sudden power-off event only when the voltage of the external power EP is smaller than the first voltage threshold or the voltage of the shutdown notification signal IR is smaller than the second voltage threshold preferably for a predetermined value (e.g., 1 ms) in step S204. Thus, a wrong determination resulted by the volatility or variation in the voltage level is avoided.

If the determination result obtained in step S206 is no, step S204 is then executed so as to configure the control unit 140 to continue monitoring the voltage levels of the external power EP and the shutdown notification signal IR. Alternatively, if the determination result obtained in step S206 is yes, performing step S208: configuring the control unit 140 to stop receiving the data transmitted from the host 200 and stop an operation of the communication interface 170, thereby avoiding power consumption of the communication interface 170. Thereafter, performing step S210: configuring the control unit 140 to copy or move the data in the volatile memory 150 to the data flush block 166 or flush the data in the internal registers of the control unit 140 to the data flush block 166. Thereafter, performing step S212: entering the control unit 140 into a stand-by mode.

It is to be noted that step S208 may be optional according to the actual design requirements in other embodiments. Further, according to the actual design requirements, the control unit 140 may be configured only to stop receiving the data transmitted from the host 200 or only to stop an operation of the communication interface 170 in step S208.

Figure 3:
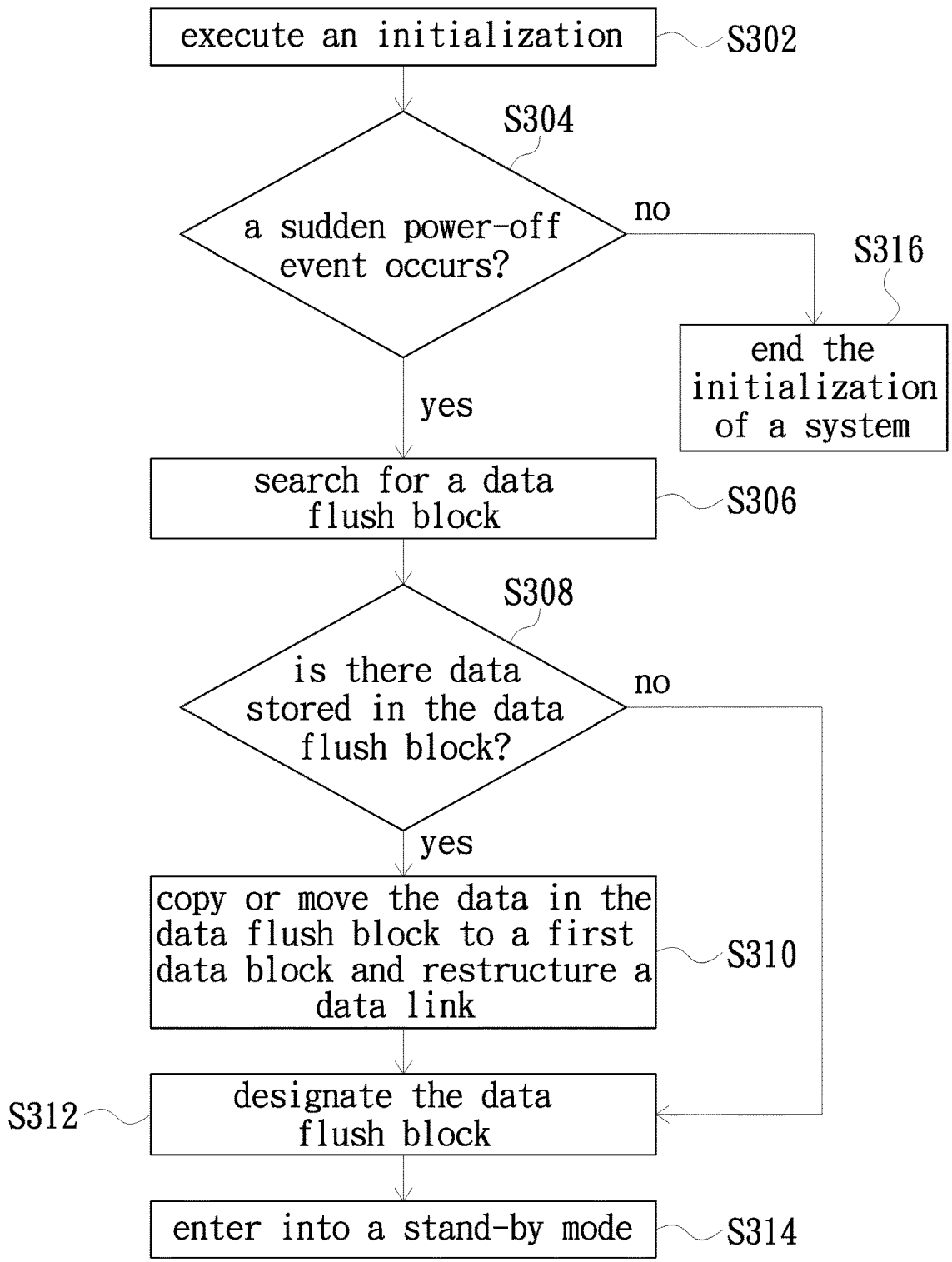
FIG. 3 is a flowchart of a system initializing method after a sudden power-off event occurs.

FIG. 3 is a flowchart of a system initializing method after a sudden power-off event occurs in accordance with an embodiment of the present invention. Please refer to FIG. 1 and FIG. 3 together. First, performing step S302: executing an initialization after the data storage device 100 is powered on. Thereafter, performing step S304: determining whether a sudden power-off event occurs. If the determination result obtained in step S304 is yes, performing step S306: configuring the control unit 140 to search for the data flush block 166. Alternatively, if the determination result obtained in step S304 is no, thereafter performing step S316: ending the initialization of the system.

Thereafter, performing step S308: configuring the control unit 140 to determine whether there is data stored in the data flush block 166. If the determination result obtained in step S308 is yes, thereafter performing step S310: configuring the control unit 140 to copy or move the data in the data flush block 166 to one of the first data blocks in the spare data block pool 168 and restructure the data link. In another embodiment, the control unit 140 is configured to copy or move the data in the data flush block 166 to one of the second data blocks in the spare data block pool 168 and restructure the data link in step S310. Thereafter, performing step S312: configuring the control unit 140 to designate the data flush block 166. In one preferred embodiment, the data flush block 166 is a second data block in the spare data block pool 168 or a first data block in the spare data block pool 168. It is to be noted that if there is no data stored in the original data flush block, the original data flush block may be designated as the data flush block 166. If the determination result obtained in step S308 is no, step S312 is executed directly after step S308. Thereafter, performing step S314: entering the control unit 140 into a stand-by mode to allow the control unit 140 to prepare for receiving data or commands from the host 200.

In addition, based on the circuit shown in FIG. 1, the extended power supply time of the charge storage device 120 can be calculated according to the following equation (1):

$$T = \frac{(1/2)C(HV^2 - VD^2)}{(V1 \times I1) + (V2 \times I2) + (V3 \times I3) + (V4 \times I4)} \quad (1)$$

wherein T is the extended power supply time; C is the capacitance of the charge storage device 120; HV is the voltage of the pull-up power HV generated by the voltage pull-up module 110; VD is the disable voltage of the voltage pull-down circuits 132, 134, 136 and 138; V1, V2, V3 and V4 are the voltages of the pull-down powers generated by the voltage pull-down circuits 132, 134, 136 and 138 respectively; and I1, I2, I3 and I4 are the currents of the pull-down powers generated by the voltage pull-down circuits 132, 134, 136 and 138 respectively. In equation (1), the capacitance C can be calculated based on parameters of the actual circuit design of the data storage device 100, such as the time required by the non-volatile memory 160 to write one record of data, the amount of written data, and the operating voltages and currents of the control unit 140, the volatile memory 150 and the non-volatile memory 160; no redundant detail on the parameters is to be given herein.

In summary, by equipping the data storage device with an additional voltage pull-up module and charge storage device and designating a data flush block without data buffering function from the non-volatile memory, the charge storage device can extend the power supply time of the data storage device of the present invention once a sudden power-off event occurs. Therefore, the control unit may copy or move the data from the volatile memory to the data flush block within the extended power supply time; and consequently, the data storage device and the data storing method of the present invention can store data more safely and accurately.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A system initializing method after a sudden power-off event occurs, executed in a data storage device, wherein the data storage device connects to a host, the data storage device is operated by a power from the host, the data storage device comprises a control unit, a volatile memory and a non-volatile memory, and the system initializing method comprises steps of:
- determining whether the sudden power-off event of the data storage device occurs by the control unit, wherein when the sudden power-off event of the data storage device occurs, the control unit copies or moves first data stored in the volatile memory of the data storage device to a data flush block in the non-volatile memory, and stops receiving second data transmitted from the host;
- if yes, searching for the data flush block in the non-volatile memory by the control unit, wherein the data flush block is configured to not provide data buffering function under a normal operation, and the control unit accesses the data flush block only when the sudden power-off event of the data storage device occurs;
- determining whether there is the first data stored in the data flush block by the control unit;
- if yes, copying or moving the first data to a spare data block in the non-volatile memory by the control unit;
- restructuring a data link according to the first data in the spare data block by the control unit; and
- designating another data flush block in the non-volatile memory by the control unit.

2. The system initializing method according to claim 1, wherein the data block is selected from a first data block in a spare data block pool of the non-volatile memory.

3. The system initializing method according to claim 1, wherein the data block is selected from a second data block in a spare data block pool of the non-volatile memory.

4. A data storing method for a data storage device, wherein the data storage device connects to a host, the data storage device is operated by a power from the host, the data storage device comprises a control unit, a volatile memory and a non-volatile memory, and the data storing method comprises steps of:
- designating a data flush block in the non-volatile memory by the control unit, wherein the data flush block is configured to not provide data buffering function under a normal operation, and the control unit accesses the data flush block only when a sudden power-off event of the data storage device occurs;
- determining whether the sudden power-off event of the data storage device occurs by the control unit;
- if yes, searching for the data flush block in the non-volatile memory by the control unit;
- determining whether there is the first data stored in the data flush block by the control unit;
- if yes, copying or moving the first data to a spare data block in the non-volatile memory, and stopping receiving second data transmitted from the host by the control unit;
- restructuring a data link according to the first data in the spare data block by the control unit; and
- designating another data flush block in the non-volatile memory by the control unit.

5. The data storing method according to claim 4, wherein the step of determining whether the sudden power-off event occurs further comprises a step of:
- determining whether the data storage device has the sudden power-off event lasting for a predetermined duration.

6. The data storing method according to claim 4, wherein the step of copying or moving the first data stored in the volatile memory to the data flush block further comprises a step of:
- stopping an operation of a communication interface electrically coupled between the host and the control unit of the data storage device.

7. The data storing method according to claim 4, wherein the data storage device further comprises a voltage pull-down module, the voltage pull-down module comprises at least one voltage pull-down circuit, the at least one voltage pull-down circuit is configured to generate at least one pull-down power, and the control unit receives the pull-down power and provides the pull-down power as operating power of its internal components.

8. The data storing method according to claim 7, wherein the control unit further comprises a voltage detection unit, the voltage detection unit is configured to receive an external power provided by the host, and determine whether the sudden power-off event occurs by comparing the external power and a voltage threshold.

* * * * *